(12) United States Patent
Suga

(10) Patent No.: US 6,956,867 B1
(45) Date of Patent: Oct. 18, 2005

(54) METHOD AND ROUTER CHANGING FRAGMENT SIZE OF DATA PACKETS

(75) Inventor: Takaaki Suga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 603 days.

(21) Appl. No.: 09/612,700

(22) Filed: Jul. 10, 2000

(30) Foreign Application Priority Data

Aug. 13, 1999 (JP) ................... 11-229468

(51) Int. Cl.[7] ............................................. H04J 3/16
(52) U.S. Cl. ...................................... 370/465; 370/474
(58) Field of Search ............................... 370/465, 468, 370/470, 471, 472, 474

(56) References Cited

U.S. PATENT DOCUMENTS

| | | | | |
|---|---|---|---|---|
| 4,771,391 A | * | 9/1988 | Blasbalg | 709/232 |
| 5,115,429 A | * | 5/1992 | Hluchyj et al. | 370/231 |
| 5,307,351 A | * | 4/1994 | Webster | 370/470 |
| 5,579,301 A | * | 11/1996 | Ganson et al. | 370/229 |
| 5,781,554 A | * | 7/1998 | Organ | 370/474 |
| 6,252,855 B1 | * | 6/2001 | Langley | 370/252 |
| 6,370,163 B1 | * | 4/2002 | Shaffer et al. | 370/519 |
| 6,570,849 B1 | * | 5/2003 | Skemer et al. | 370/230.1 |

FOREIGN PATENT DOCUMENTS

| | | |
|---|---|---|
| JP | 57-145456 | 9/1982 |
| JP | 58-173932 | 10/1983 |

* cited by examiner

*Primary Examiner*—Huy D. Vu
*Assistant Examiner*—Daniel Ryman
(74) *Attorney, Agent, or Firm*—Katten Muchin Rosenman LLP

(57) ABSTRACT

A method of changing a fragment size of data packets in a router where a data packet is divided into the data packets having the fragment size, and are transmitted to a network along with audio packets includes the steps of acquiring, in the router, a parameter indicative of whether proper audio quality is maintained through transmission of the audio packets, and changing the fragment size of the data packets in response to the acquired parameter.

12 Claims, 11 Drawing Sheets

FIG. 5A

⟨GATEKEEPER TABLE⟩

| ITEM | PREFIX NUMBER | VoIP ROUTER ADDRESS | COMMUNICATION FLAG |
|---|---|---|---|
| 1 | 7000 | 127.0.2.1 | 0 |
| 2 | 7001 | 128.0.2.1 | 1 |
| 3 | 7002 | 129.0.2.1 | 1 |

FIG. 5B

⟨VoIP ROUTING TABLE⟩

| | NETWORK | VoIP ROUTING TABLE COST (DISTANCE) | RELAY ROUTER |
|---|---|---|---|
| VoIP ROUTER (22A) | | | |
| | 127.0.1.1 | 0 | — |
| | 127.0.2.1 | 0 | — |
| | 127.0.3.1 | 1 | 128.0.3.1 |
| | 127.0.3.1 | 1 | 129.0.3.1 |
| VoIP ROUTER (22B) | | | |
| | 128.0.1.1 | 0 | — |
| | 128.0.2.1 | 0 | — |
| | 128.0.3.1 | 1 | 127.0.3.1 |
| VoIP ROUTER (22C) | | | |
| | 129.0.1.1 | 0 | — |
| | 129.0.2.1 | 0 | — |
| | 129.0.3.1 | 1 | 127.0.3.1 |

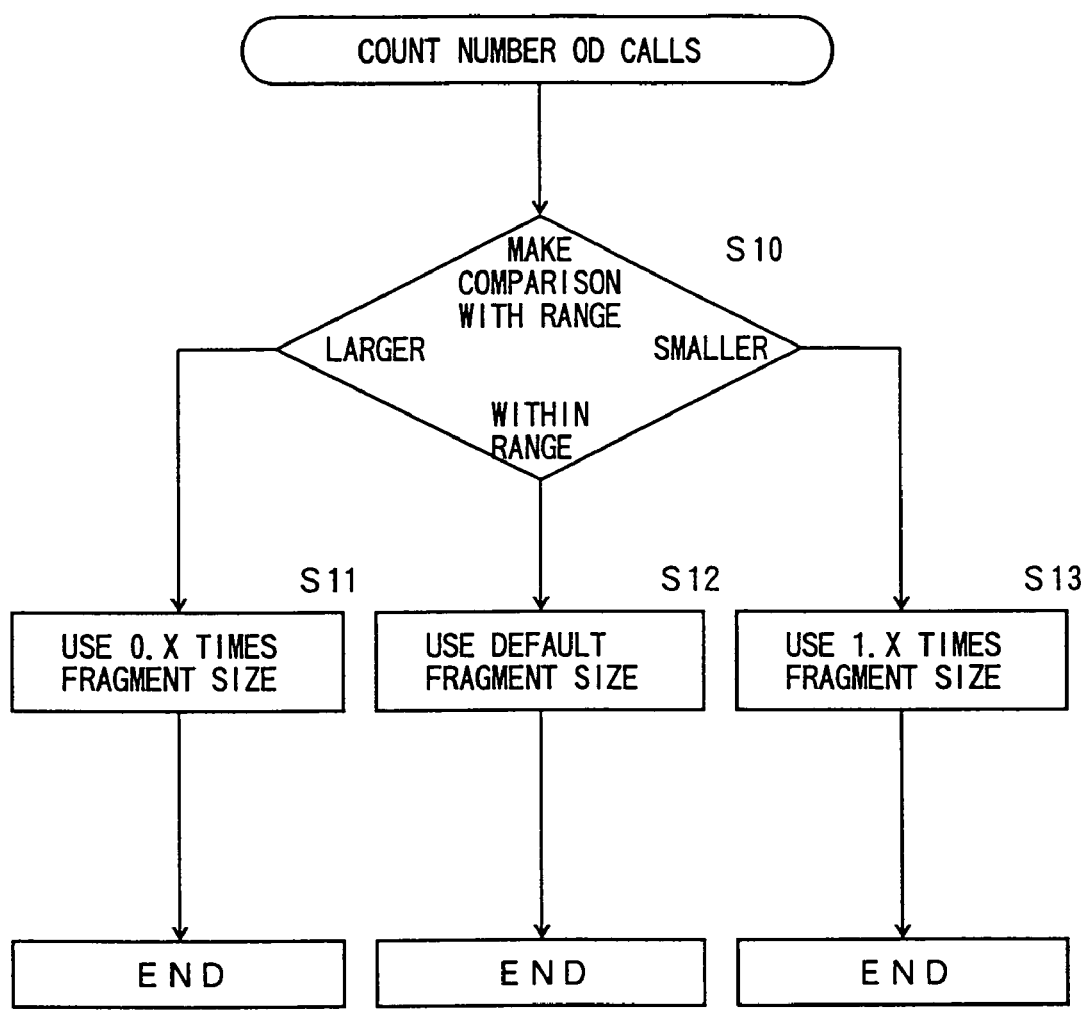

METHOD AND ROUTER CHANGING
FRAGMENT SIZE OF DATA PACKETS

BACKGROUND OF THE INVENTION

1. Field of the Invention

The present invention generally relates to a router and a method of changing a fragment size of data packets, and particularly relates to a router connected to a network conveying data packets and audio packets and a method of changing a fragment size of data packets that are supplied to the network.

2. Description of the Related Art

FIG. 1 is an illustrative drawing for explaining a VoIP (voice over internet protocol) router.

As shown in FIG. 1, a VoIP router 11 is provided between a WAN (wide are network), a LAN (local area network), and a PBX (private branch exchange) 10. The VoIP router 11 converts data signals and audio signals into packets when the data signals are supplied from the LAN, and the audio signals are supplied from the PBX 10, and sends the packets to the WAN. When receiving data packets and audio packets from the WAN, the VoIP router converts these packets into data signals and audio signals, which are then supplied to the LAN and the PBX 10, respectively.

The VoIP router 11 establishes interface with the LAN, the WAN and the PBX 10.

In the VoIP router 11, there is a need to avoid making an audio frame wait until transmission of a packet to the WAN is finished where the packet may be such a long packet as that of FTP (file transfer protocol) or HTTP (hypertext transport protocol). To this end, such a long packet is divided, and audio packets are inserted therebetween. This is called fragmentation. The VoIP router checks an MTU (maximum transfer unit) size of the IP (Internet protocol) layer. When the router receives a packet having a size exceeding the MTU size, the router notifies, via ICMP (Internet control message protocol), the source of the packet that the excess size of the packet creates errors, and notifies the source how large the MTU size is. An apparatus at the packet source adjusts the packet size to the MTU size, and transmits packets having a shorter size.

In this configuration, when the VoIP router receives a packet having a size exceeding the MTU size, the VoIP router arranges for the source to transmit shorter packets matching the MTU size. Alternatively, the VoIP router may change the packet to a shorter packet that conforms to the MTU size.

Data that is transmitted via FTP or HTTP forms a packet as large as 1000 bytes, for example. Audio packets, on the other hand, have a size that is as small as a two-digit figure in byte.

FIG. 2 is an illustrative drawing for explaining transmission of data from a router.

As shown in FIG. 2, a long packet D may be divided into shorter packets D1 through D5, which are then transmitted to the WAN while audio packets V1 through V4 having priority are inserted between the shorter packets D1 through D5. Even in this case, transmission of the audio packets may be delayed if the MTU size is relatively large, thereby degrading audio quality.

For example, if the MTU size is so large that the data packets D1 through D5 are significantly larger than the audio packets V1 through V5, the audio packets V1 through V3 are delayed by the data packet D5, and the audio packet V1 is further delayed by the data packet D4.

In general, the shorter the fragment size of data, the higher the audio quality is. However, improvement in the audio quality is achieved at the expense of the throughput of data communication. Accordingly, if sufficient audio quality is being maintained, the fragment size of data may be lengthened to boost the throughput of data communication.

Conventionally, the MTU size is fixed, and does not change dynamically to cope with situational changes.

Accordingly, there is a need for a scheme that can automatically change a fragment size of a data packet so as to keep audio quality within a predetermined range.

SUMMARY OF THE INVENTION

It is a general object of the present invention to provide a router and a method of changing a fragment size that substantially obviate one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a router and a method particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a method of changing a fragment size of data packets in a router where a data packet is divided into the data packets having the fragment size, and are transmitted to a network along with audio packets, including the steps of acquiring, in the router, a parameter indicative of whether proper audio quality is maintained through transmission of the audio packets, and changing the fragment size of the data packets in response to the acquired parameter.

In the method described above, the parameter that indicates whether proper audio quality is maintained is acquired, and is consulted to change the fragment size of the data packets. This makes it possible to improve data throughput while securing proper audio quality.

According to the present invention, the parameter is selected from a wait time of the audio packets, a delay time of the network, the number of congestion notices, and the number of audio calls. The wait time is a time period for which the audio packets wait in the router before being transmitted to the network. The delay time of the network is a time period that passes from transmission of a hello packet to reception of the hello packet returning from the network. The number of congestion notices indicates how many times a congestion notice is received from the network during a predetermined time period. The number of audio calls indicates the number of audio calls simultaneously taking place in the router. Use of one of these parameters makes it possible to improve data throughput while securing proper audio quality.

BRIEF DESCRIPTION OF THE DRAWINGS

FIGS. 5A and 5B are tables showing data structures of a gatekeeper table and a routing table, respectively;

FIG. 12 is a flowchart of a fifth method of adjusting a fragment size.

DESCRIPTION OF THE PREFERRED EMBODIMENTS

In the following, embodiments of the present invention will be described with reference to the accompanying drawings.

Figure 1:
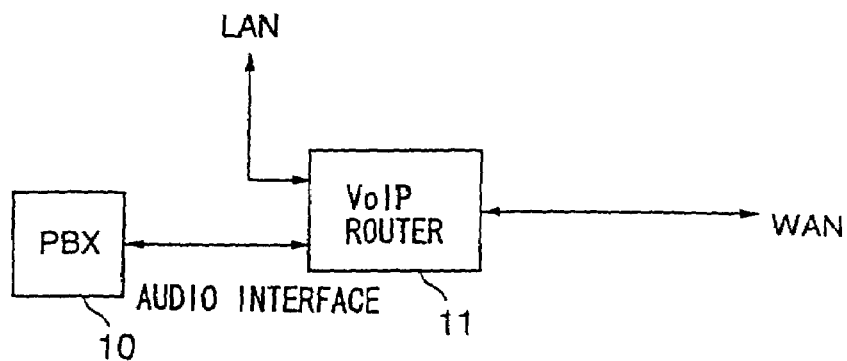
FIG. 1 is an illustrative drawing for explaining a VoIP router.
Figure 2:
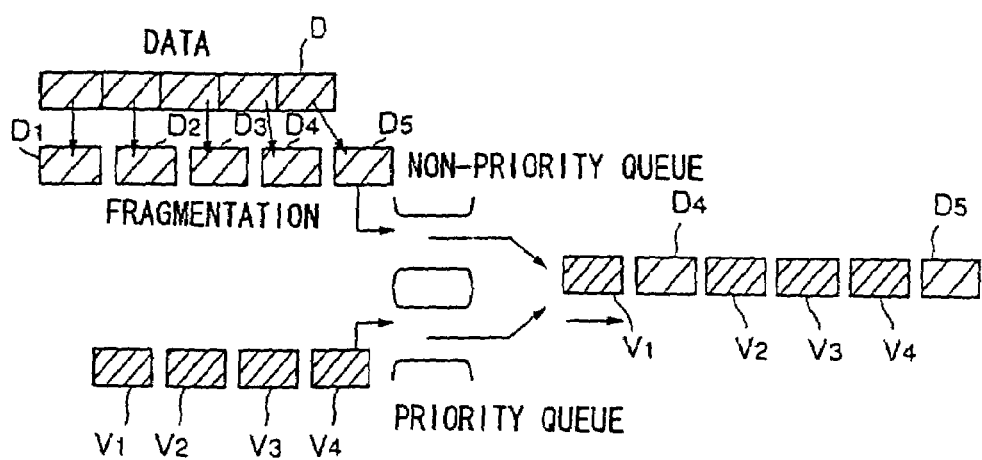
FIG. 2 is an illustrative drawing for explaining transmission of data from a router.
Figure 3:
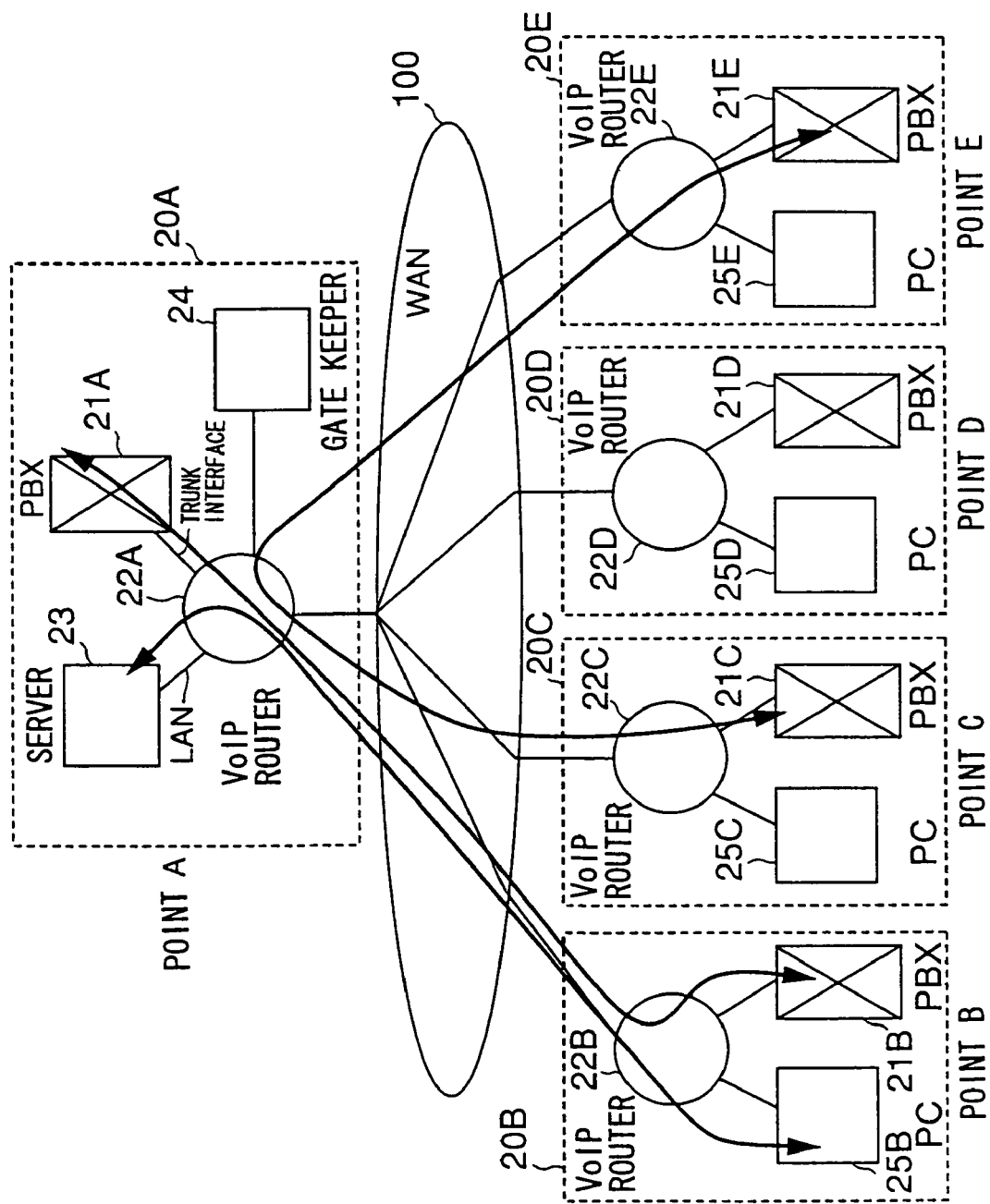
FIG. 3 is an illustrative drawing showing a system to which the present invention is applied.

FIG. 3 is an illustrative drawing showing a system to which the present invention is applied.

The system of FIG. 3 is made up from points A through E that are connected to a WAN 100. In FIG. 3, points A, B, C, D, and E are additionally referenced by reference numerals 20A, 20B, 20C, 20D and 20E, respectively. The WAN 100 is comprised of dedicated lines, frame-relay networks, ATM networks, and the like. The point A is comprised of a PBX 21A, VoIP router 22A, a server 23, and a gatekeeper 24. The points B through E have an identical configuration, and include PBXs 21B through 21E, VoIP routers 22B through 22E, and personal computers 25B through 25E, respectively.

The VoIP routers 22A through 22E are connected to each other via the WAN 100. The point A plays a key role in the system of FIG. 3, and attends to inter-computer communication (e.g., between the server 23 of the point A and the personal computer 25B of the point B) as well as inter-PBX audio communication (e.g., between the PBX 21A of the point A and the PBX 21B of the point B via the VoIP router 22A of the point A). The WAN conveys both the data packets and the audio packets.

Figure 4:
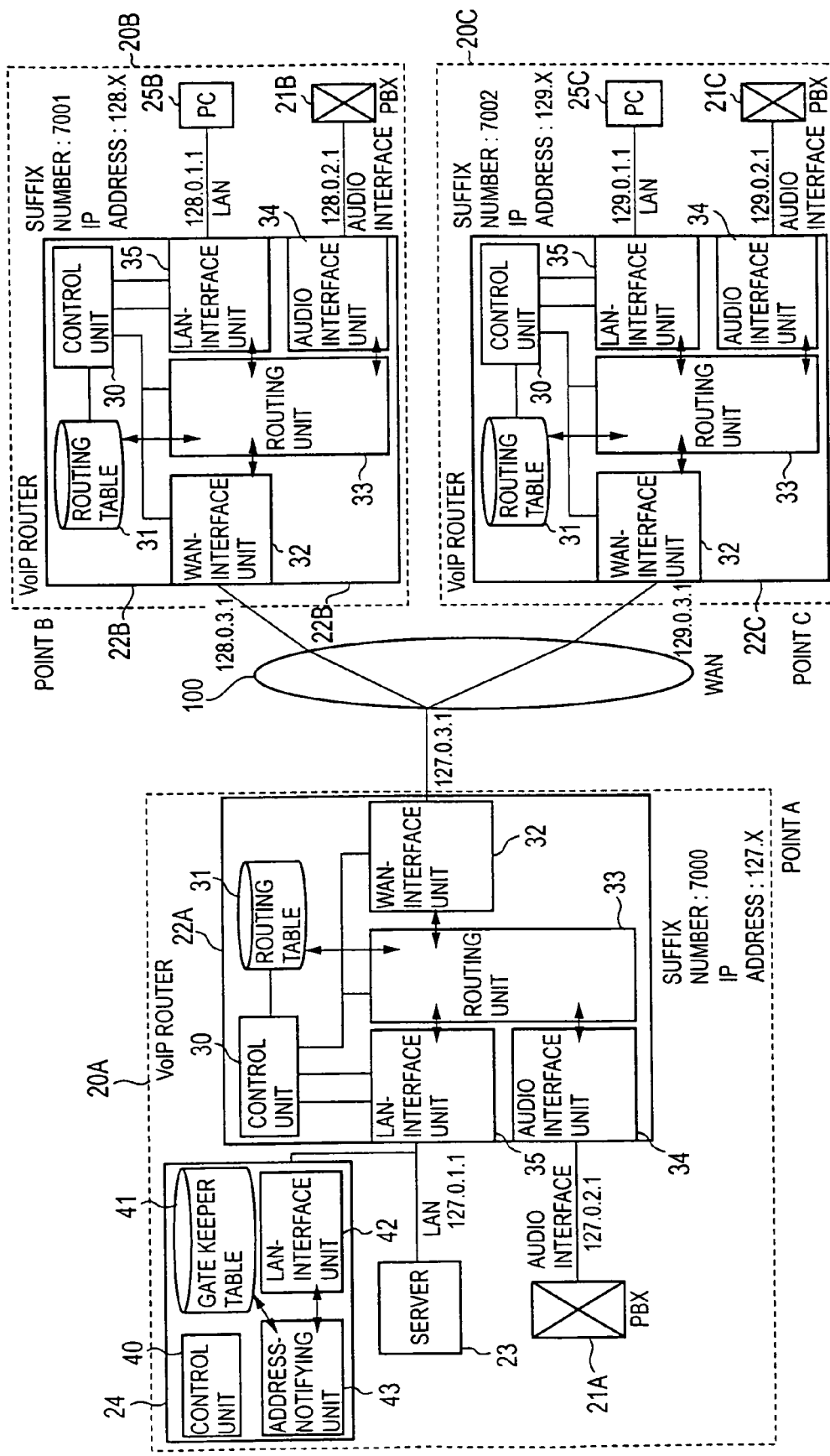
FIG. 4 is a block diagram showing configurations of VoIP routers and a gatekeeper of FIG. 3.

FIG. 4 is a block diagram showing configurations of the VoIP routers and the gatekeeper.

The VoIP router 22 converts data signals and audio signals into IP frames, and transmits the IP frames. In FIG. 4, any one of the VoIP routers 22A through 22C includes a control unit 30, a routing table 31, a WAN-interface unit 32, a routing unit 33, an audio-interface unit 34, and a LAN-interface unit 35. The LAN-interface unit 35 is connected to the server 23 or the personal computer 25B or 25C via a LAN. The audio-interface unit 34 is connected to the PBX 21A, 21B, or 21C.

The control unit 30 of the VoIP router attends to overall control of the VoIP router. In detail, the control unit 30 arranges for the LAN-interface unit 35 to attend to packet-dividing/assembling operation, and arranges for the routing unit 33 to attend to packet-priority-control operation. Further, the control unit 30 updates the routing table 31 as it becomes necessary through communication with other VoIP routers, and conducts communication with the gatekeeper 24.

The LAN-interface unit 35 establishes interface with a LAN such as 10/100BASE. In detail, the LAN-interface unit 35 divides a long packet, and assembles divided packets under the control of the control unit 30.

The audio-interface unit 34 establishes interface with the PBX 21A, 21B, or 21C. In detail, the audio-interface unit 34 digitizes audio signals and signaling signals, and hands the digitized signals to the routing unit 33. Further, the audio-interface unit 34 detects signaling information (e.g., call-transmission information, call-reception information, phone-number information, and so on), and informs the control unit 30.

The routing unit 33 delivers received packets to the WAN-interface unit 32, the audio-interface unit 34, and the LAN-interface unit 35 according to their destinations. Selection of an interface unit is made by referring to a routing table by using an address portion of a packet header. Further, the routing unit 33 has a queue for packet transmission, and adjusts a transmission order and transmission timings under the control of the control unit 30.

The routing table 31 is a table that stores correspondences between IP addresses and VoIP routers.

FIGS. 5A and 5B are tables showing data structures of a gatekeeper table and a routing table, respectively.

As shown in FIG. 5B, the VoIP routing table includes network addresses, costs, and relay routers.

In the routing table 31 of the VoIP router 22A at the point A, for example, the address 127.0.1.1 is listed together with cost "0" and no relay router. This address 127.0.1.1 indicates the address of the server 23 provided at the point A. The cost of the server 23 indicates the number of intervening routers from the VoIP router 22A to the server 23, and, thus, is zero in this case. Since there is no need for relaying, no entry is given in the field for the relay router.

Further, the address 127.0.3.1 at the point A is listed together with cost "1" and two relay routers having addresses 128.0.3.1 and 129.0.3.1.

The routing table 31 of the point B and the routing table 31 of the point C are structured in the same manner as the routing table 31 of the point A.

The gatekeeper 24 includes a control unit 40, a gatekeeper table 41, a LAN-interface unit 42, and an address-notifying unit 43.

The control unit 40 of the gatekeeper 24 attends to overall control of the gatekeeper. In details, the control unit 40 detects current audio communication conditions, and updates the gatekeeper table.

The gatekeeper table 41 is a table in which phone numbers are stored with matching IP addresses. Communication flags are also stored for the purpose of management and control of audio communication conditions.

As shown in FIG. 5A, the gatekeeper table 41 includes prefix numbers, VoIP-router addresses, and communication flags.

As shown in FIG. 5A, the VoIP-router address of a PBX at the point A having the prefix number 7000 is 127.0.2.1. The VoIP-router address of a PBX at the point B having the prefix number 7001 is 128.0.2.1. The VoIP-router address of a PBX at the point C having the prefix number 7002 is 129.0.2.1.

The gatekeeper table 41 is used for controlling the prefix numbers. On the other hand, extension numbers are controlled by the PBX. A communication flag that is 1 indicates an ongoing status of communication, and a communication flag that is 0 indicates no current communication.

The LAN interface unit 42 establishes interface with a LAN such as 10/100BASE.

The address-notifying unit 43 refers to the gatekeeper table 41, and responds to an inquiry of a phone number or an IP address when it is issued from a VoIP router.

Operation of the configuration of FIG. 4 will be described below with reference to an example in which communication is simultaneously conducted between the point A and point B and between the point A and the point C.

[Telephone Communication Between A and B]

A phone call is made from a phone connected to the PBX 21A at the point A to a phone connected to the PBX 21B at the point B. A procedure for establishing this communication will be described below.

1. When a call is made from the phone connected to the PBX 21A of the point A to the phone at 7001-xxxx that is connected to the PBX 21B of the point B, the PBX 21A at the point A ascertains from the prefix of the call that the call is not directed to itself but directed to an outside station. The PBX 21A sends signaling information to the VoIP router 22A.

2. The audio-interface unit 34 of the VoIP router 22A forwards the signaling information to the control unit 30, and digitizes it.

3. The control unit 30 sends an inquiry to the gatekeeper 24 to learn an IP address of the VoIP router corresponding to the prefix number 7001.

4. The address-notifying unit 43 of the gatekeeper 24 refers to the gatekeeper table 41 to obtain the IP address 128.0.2.1 of the audio-interface unit 34 of the VoIP router 22B corresponding to the prefix number 7001, and sends the obtained IP address to the VoIP router 22A as a reply to the inquiry. Further, the control unit 40 of the gatekeeper 24 detects a start of audio communication between the VoIP router 22A and the VoIP router 22B, and sets a communication flag in the relevant table.

5. The control unit 30 of the VoIP router 22A sends the received IP address to the routing unit 33 when the IP address is received from the gatekeeper 24. The routing unit 33 at the point A consults the routing table 31, and finds an IP address 127.0.3.1 as an address to which the call is directed. Then, a packet directed to the VoIP router 22B is generated, and is send to the WAN-interface unit 32 of the point A.

6. The WAN-interface unit 32 at the point A transmits the packet to the WAN 100.

7. The WAN-interface unit 32 at the point B receives the packet from the VoIP router 22A, and passes the packet to the routing unit 33.

8. The routing unit 33 at the point B refers to the routing table 31 at the point B, and ascertains that the packet is directed to the audio-interface unit 34 of the point B. The packet is then sent to the audio-interface unit 34 of the point B.

9. The audio-interface unit 34 at the point B disassembles the packet, and converts the signaling information into an analog signal, which is then sent to the PBX 21B.

10. The PBX 21B makes a relevant phone start ringing. When a user picks up the phone, signaling information to that effect is sent to the caller at the point A via the VoIP router 22A and the PBX 21A. The caller at the point A leans that his/her call is connected.

11. Audio communication is also converted into packets in the same manner as the signaling information, and these packets are exchanged between the VoIP routers.

12. When the user hangs up after finishing the call, the control unit 30 of the VoIP router 22A on the caller side notifies the gatekeeper 24 of the end of the call.

13. The control unit 40 of the gatekeeper 24 resets the flag in the relevant table in response to the notice from the VoIP router 22A.

This ends the communication between the point A and the point B.

A phone call from the point A to the point C is processed in much the same manner as described above, with the VoIP router 22C taking a place of the VoIP router 22B.

Concurrently with the audio communication, data communication can be conducted between the server 23 and the personal computer 25 of the point B or between the server 23 and the personal computer 25 of the point C. In practice, audio communication and data communication coexist as they are conducted.

The present invention improves efficiency of data communication while keeping constant the transmission intervals of audio packets for the purpose of securing audio quality. In order to keep constant the transmission intervals of audio packets, a long packet for data communication is evenly divided into packets of a predetermined length. The shorter the length of the data packets, the better the audio quality is. Improvement of audio quality comes at the expense of throughput of data communication.

In order to enhance efficiency of data communication while securing audio quality, therefore, the present invention adjusts a length that divides a long packet according to the procedure as follows.

[First Method]

This method determines a fragment size of data packets based on a wait time of an audio packet in queue where the wait time is measured by the VoIP router.

In FIG. 4, the routing unit 33 of the VoIP router 22A creates a queue for each session. The routing unit 33 of the VoIP router 22A measures a wait time of an audio packet in queue, and notifies the control unit 30 of the measured wait time.

Figure 7:
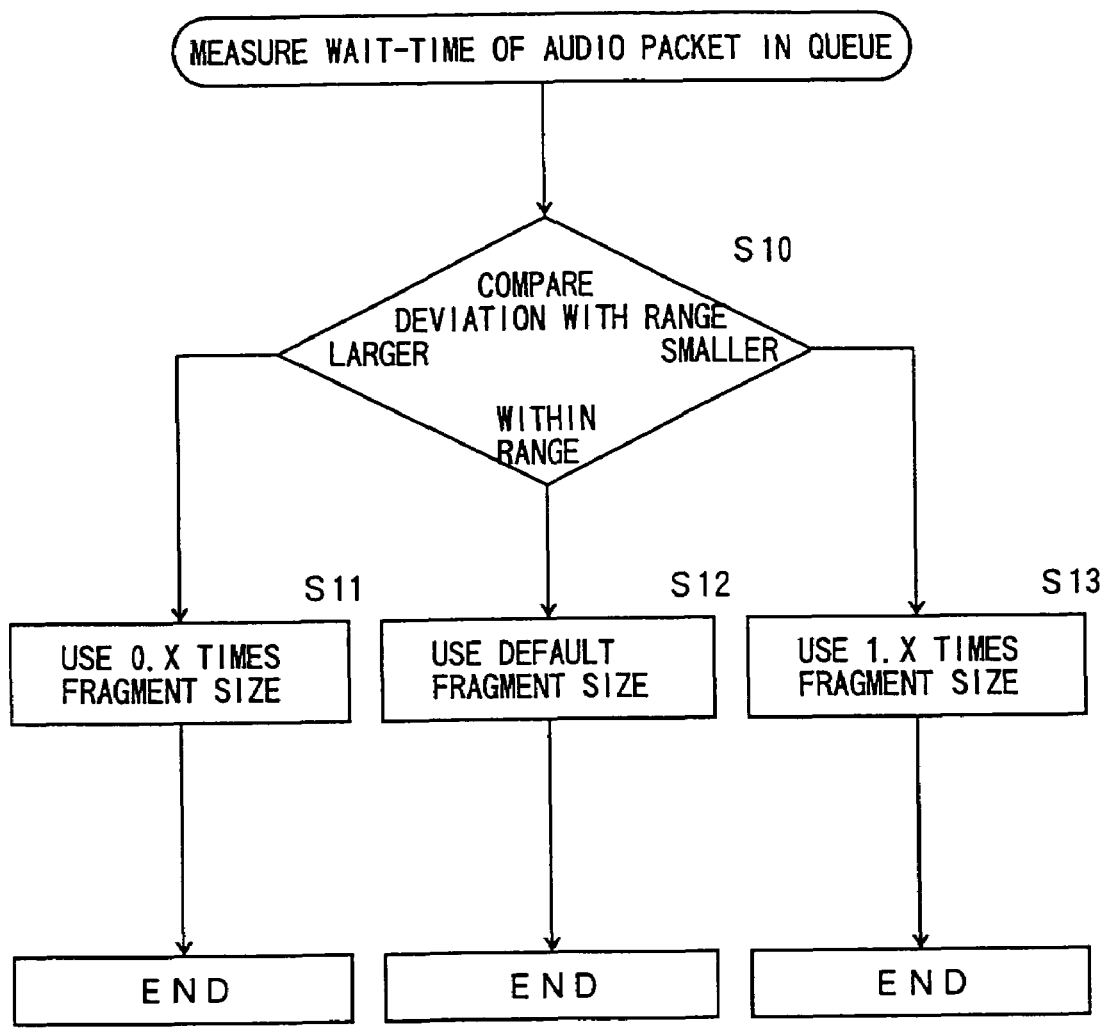
FIG. 7 is a flowchart of a first method of adjusting a fragment size.

The control unit 30 computes an average deviation from tens or hundreds of measurements, and adjusts a fragment size by following the procedure as shown in FIG. 7.

FIG. 7 is a flowchart of a method of adjusting a fragment size.

At a step S10, a check is made as to whether the deviation falls within a predetermined range.

Figure 8:
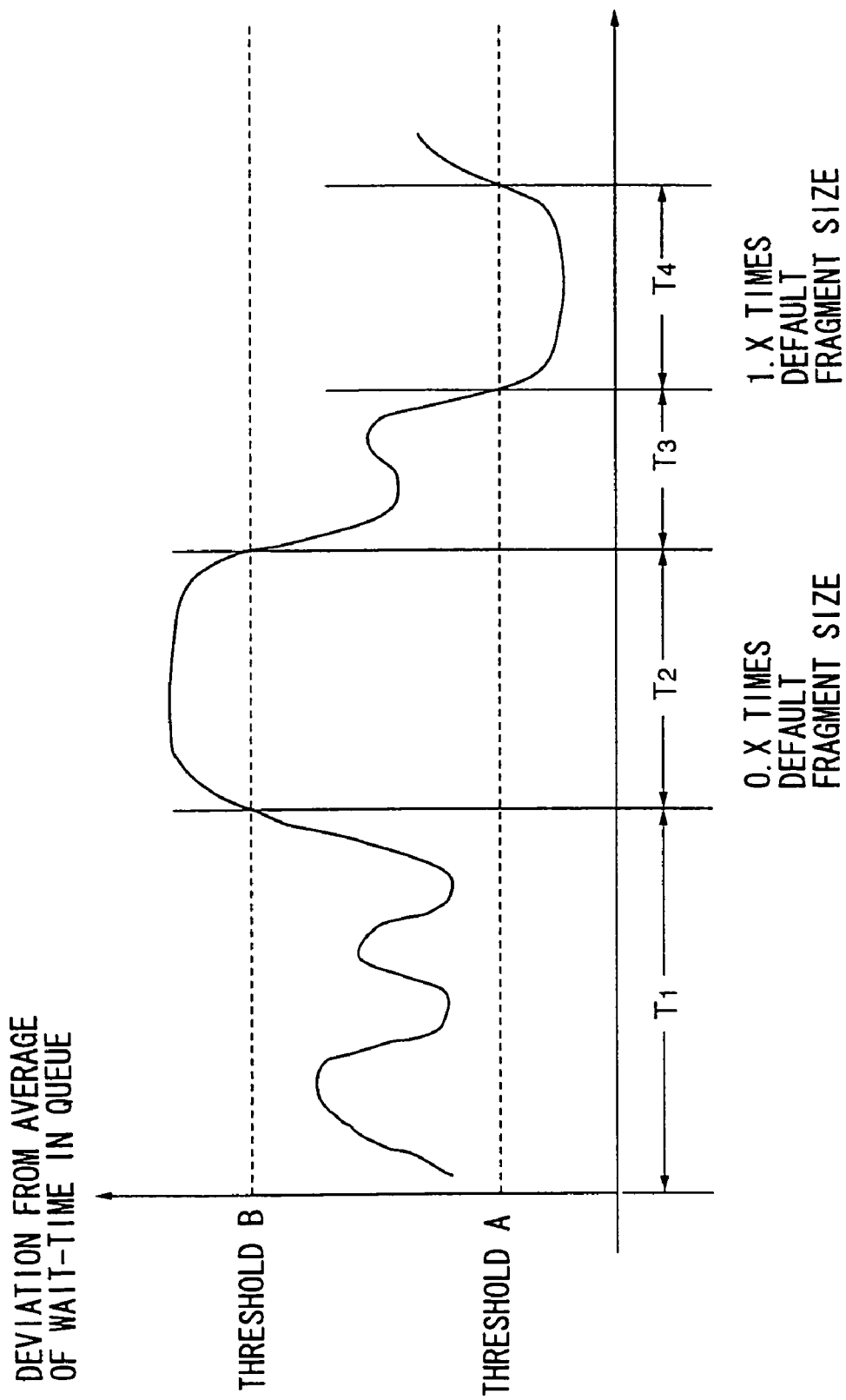
FIG. 8 is an illustrative drawing for explaining how to determine a fragment size based on a wait-time deviation.

FIG. 8 is an illustrative drawing for explaining how to determine the fragment size based on the deviation.

When the deviation continues to exceed a certain threshold (B) for more than a predetermined time period as shown in a time period T2 in FIG. 8, the control unit 30 ascertains that the transmission intervals of audio packets fluctuates so much as to make it difficult to maintain audio quality. The control unit 30 instructs the routing unit 33 to make the fragment size smaller than a default size. The routing unit 33 reduces the MTU size, thereby making smaller the packet size by a factor of 0.X. This corresponds to a step S11.

When the deviation continues to stay within the predetermined range as shown in a time period T3 in FIG. 8, the control unit 30 instructs the routing unit 33 to return the fragment size to the default size. The routing unit 33 returns the MTU size to the default size. This corresponds to a step S12.

When the deviation continues to fall below a certain threshold (A) for more than a predetermined time period as shown in a time period T4 in FIG. 8, the control unit 30 ascertains that the transmission intervals of audio packets fluctuates so little as to warrant an increase of data throughput. The control unit 30 instructs the routing unit 33 to make the fragment size larger than the default size. The routing unit 33 enlarges the MTU size, thereby making larger the packet size by a factor of 1.X. This corresponds to a step S13.

As a result, data packets are divided by the default MTU size during the time periods T1 and T3 shown in FIG. 8, whereas data packets are divided by 0.X times the default MTU size during the time period T2, and are divided by 1.X times the default MTU size during the time period T4.

In this manner, the present invention can insure desired audio quality during the time period T2, and can improve data throughput during the time period T4.

In the above description, a deviation is obtained from measurements of a wait time of audio packets in queue, and, then, is compared with some thresholds. Alternatively, a wait time rather than the deviation may be used and compared with thresholds.

[Second Method]

This method determines a fragment size of data packets based on a delay time of a network where the delay time is measured by the VoIP router using a hello packet.

The control unit 30 of the VoIP router 22A exchanges hello packets at constant intervals with other VoIP routers by using the routing protocol.

Figure 9:
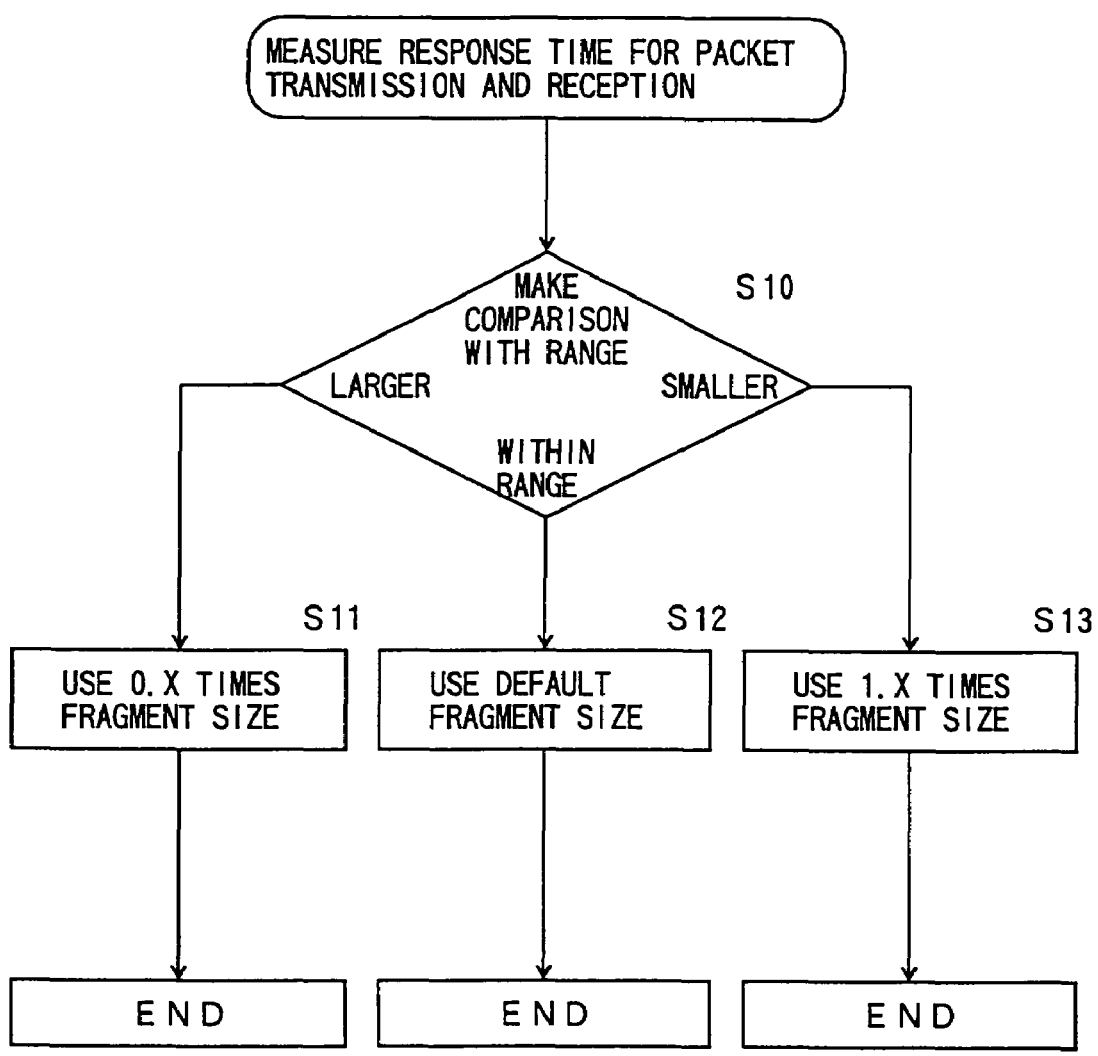
FIG. 9 is a flowchart of a second method of adjusting a fragment size.

The control unit 30 measures a response time as a time period that passes from transmission of a hello packet to reception of the hello packet returning from another VoIP router, and adjusts a fragment size by following the procedure as shown in FIG. 9.

FIG. 9 is a flowchart of a method of adjusting a fragment size.

At a step S10, a check is made as to whether the response time falls within a predetermined range.

When the response time continues to exceed a certain threshold for more than a predetermined time period, the control unit 30 ascertains that a delay time of the network has increased to make it difficult to maintain audio quality. The control unit 30 instructs the routing unit 33 to make the fragment size smaller than a default size. The routing unit 33 reduces the MTU size, thereby making smaller the packet size. This corresponds to a step S11.

When the response time continues to stay within the predetermined range, the control unit 30 instructs the routing unit 33 to return the fragment size to the default size. The routing unit 33 returns the MTU size to the default size. This corresponds to a step S12.

When the response time continues to fall below a certain threshold for more than a predetermined time period, the control unit 30 ascertains that the delay time of the network has decreased to warrant an increase of data throughput. The control unit 30 instructs the routing unit 33 to make the fragment size larger than the default size. The routing unit 33 enlarges the MTU size, thereby making larger the packet size. This corresponds to a step S13.

As a result, data packets are divided by the default MTU size when the delay time of the network stays within the predetermined range. On the other hand, data packets are divided by smaller than the default MTU size when the delay time of the network is long, and are divided by larger than the default MTU size when the delay time of the network is short.

In this manner, the present invention can improve data throughput while insuring desired audio quality.

In the above description, the response time of the network is obtained from measurements of a time period that passes from transmission of audio packets to reception of the audio packets, and, then, is compared with some thresholds. Alternatively, a deviation of the response time may be obtained and compared with thresholds.

[Third Method]

This method determines a fragment size of data packets based on how many times a notice of network congestion is received.

In networks such as frame-relay networks, ATM networks, etc., when congestion occurs, the VoIP router 22A is notified of the congestion. As the WAN-interface unit 32 of the VoIP router 22A receives the notice of congestion, the WAN-interface unit 32 passes the notice to the control unit 30.

Figure 10:
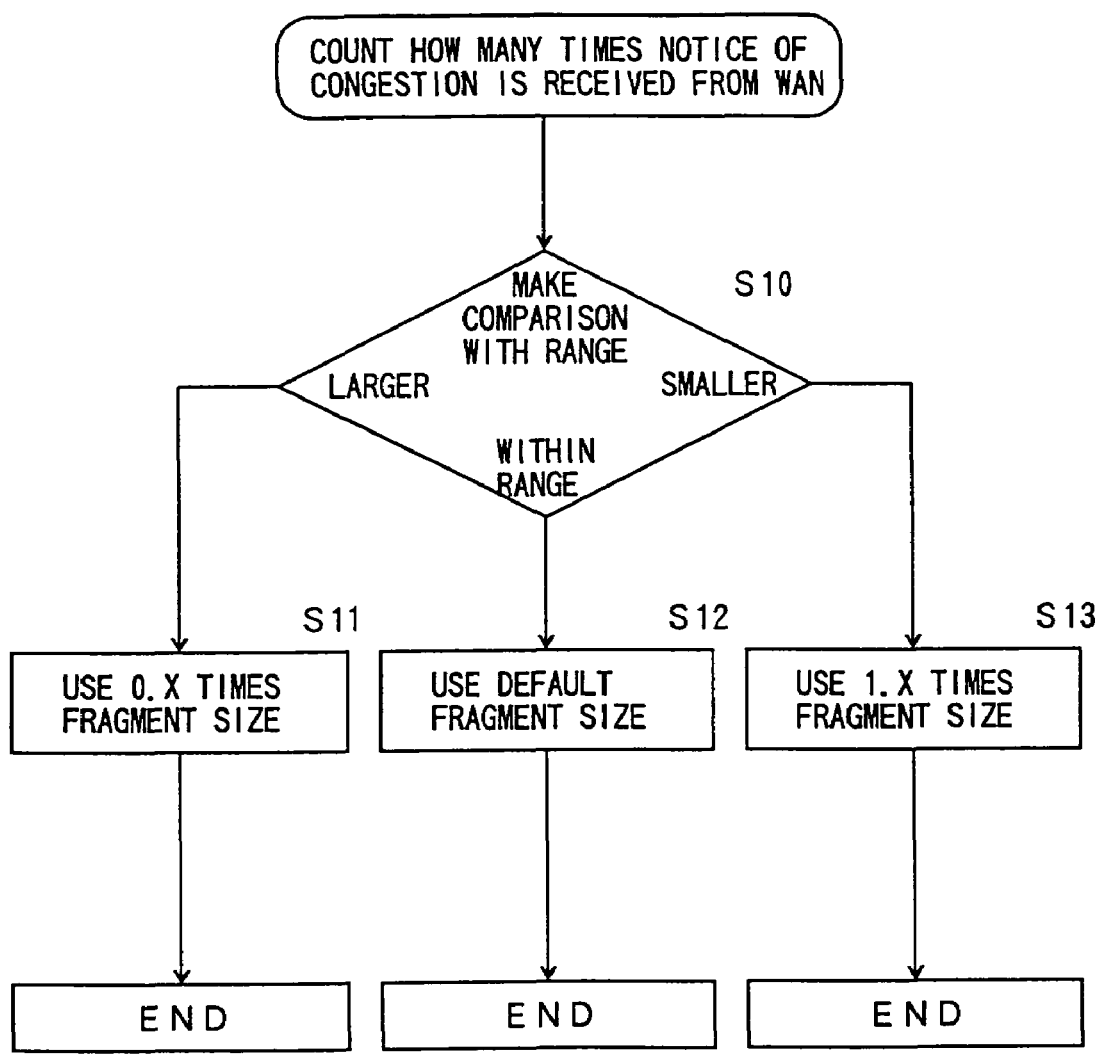
FIG. 10 is a flowchart of a third method of adjusting a fragment size.

In response, the control unit 30 of the VoIP router 22A counts how many times the notice of congestion is received during a predetermined time period, and adjusts a fragment size by following the procedure as shown in FIG. 10.

FIG. 10 is a flowchart of a method of adjusting a fragment size.

At a step S10, a check is made as to whether the number of received congestion notices falls within a predetermined range.

When the number of received congestion notices continues to exceed a certain threshold for more than a predetermined time period, the control unit 30 ascertains that the network congestion has worsened to such an extent as to make it difficult to maintain audio quality. The control unit 30 instructs the routing unit 33 to make the fragment size smaller than a default size. The routing unit 33 reduces the MTU size, thereby making smaller the packet size. This corresponds to a step S11.

When the number of received congestion notices continues to stay within the predetermined range, the control unit 30 instructs the routing unit 33 to return the fragment size to the default size. The routing unit 33 returns the MTU size to the default size. This corresponds to a step S12.

When the number of received congestion notices continues to fall below a certain threshold for more than a predetermined time period, the control unit 30 ascertains that the network congestion is so little as to warrant an increase of data throughput. The control unit 30 instructs the routing unit 33 to make the fragment size larger than the default size. The routing unit 33 enlarges the MTU size, thereby making larger the packet size. This corresponds to a step S13.

As a result, data packets are divided by the default MTU size when the number of congestion notices stays within the predetermined range. On the other hand, data packets are divided by smaller than the default MTU size when the number of congestion notices is large, and are divided by larger than the default MTU size when the number of congestion notices is small.

In this manner, the present invention can improve data throughput while insuring desired audio quality.

In the above description, the number of received congestion notices is obtained by counting how many times the notice of congestion is received from the network, and, then, is compared with some thresholds. Alternatively, a deviation of the number of congestion notices may be obtained and compared with thresholds.

[Fourth Method]

This method determines a fragment size of data packets based on the number of audio calls that is reported from an apparatus that counts such a number.

The gatekeeper 24 can check the number of audio calls taking place at each VoIP router by referring to the communication flags provided in the gatekeeper table 41. When the number of audio calls changes, the gatekeeper 24 notifies the control unit 30 of the number of audio calls.

Figure 11:
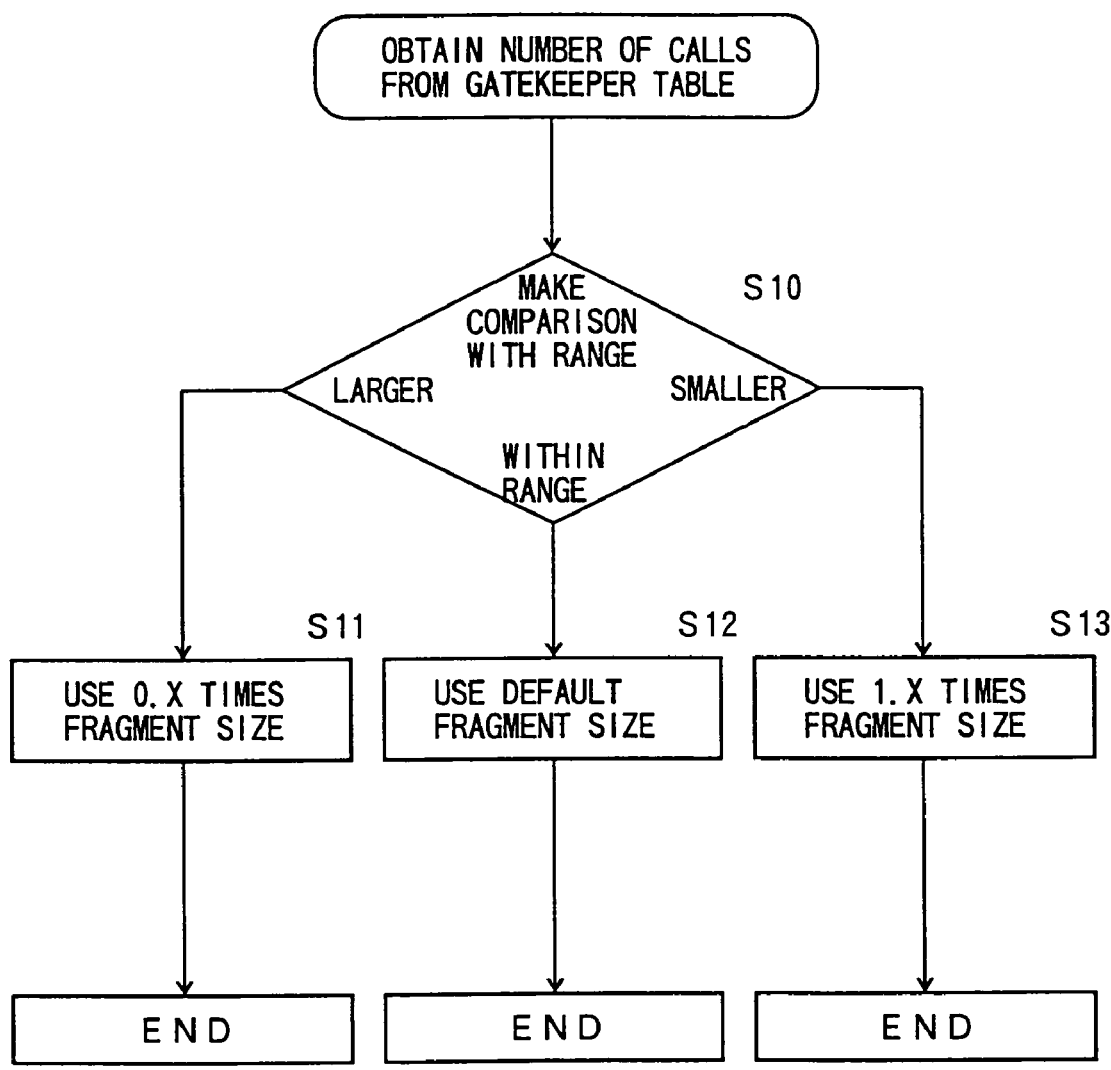
FIG. 11 is a flowchart of a fourth method of adjusting a fragment size.

In response, the control unit 30 of the VoIP router 22A adjusts a fragment size based on the number of audio calls as shown in FIG. 11.

FIG. 11 is a flowchart of a method of adjusting a fragment size.

At a step S10, a check is made as to whether the number of calls falls within a predetermined range.

When the number of calls continues to exceed a certain threshold for more than a predetermined time period, the control unit 30 ascertains that the number of audio packets has increased to such a level as to make it difficult to maintain audio quality. The control unit 30 instructs the routing unit 33 to make the fragment size smaller than a default size. The routing unit 33 reduces the MTU size, thereby making smaller the packet size. This corresponds to a step S11.

When the number of calls continues stay within the predetermined range, the control unit 30 instructs the routing unit 33 to return the fragment size to the default size. The routing unit 33 returns the MTU size to the default size. This corresponds to a step S12.

When the number of calls continues to fall below a certain threshold for more than a predetermined time period, the control unit 30 ascertains that it is warranted to increase data throughput. The control unit 30 instructs the routing unit 33 to make the fragment size larger than the default size. The routing unit 33 enlarges the MTU size, thereby making larger the packet size. This corresponds to a step S13.

As a result, data packets are divided by the default MTU size when the number of calls stays within the predetermined range. On the other hand, data packets are divided by smaller than the default MTU size when the number of calls is large, and are divided by larger than the default MTU size when the number of calls is small.

As the number of audio calls that are simultaneously taking place increases, the number of audio packets increases. This makes it necessary to divide data packets into smaller fragments in order to maintain a desired audio quality. The fourth embodiment of the present invention changes the fragment size of data packets in response to the number of audio calls, thereby making it possible to improve data throughput while insuring desired audio quality.

[Fifth Method]

This method determines a fragment size of data packets based on the number of audio calls that is counted by the VoIP router.

The control unit 30 of the VoIP router 22A can check the number of audio calls from the signaling information. The VoIP router 22A lets the control unit 30 count the number of audio calls. The control unit 30 of the VoIP router 22A adjusts a fragment size based on the number of audio calls as shown in FIG. 12.

FIG. 12 is a flowchart of a method of adjusting a fragment size.

At a step S10, a check is made as to whether the number of calls falls within a predetermined range.

When the number of calls continues to exceed a certain threshold for more than a predetermined time period, the control unit 30 ascertains that the number of audio packets has increased to such a level as to make it difficult to maintain audio quality. The control unit 30 instructs the routing unit 33 to make the fragment size smaller than a default size. The routing unit 33 reduces the MTU size, thereby making smaller the packet size. This corresponds to a step S11.

When the number of calls continues stay within the predetermined range, the control unit 30 instructs the routing unit 33 to return the fragment size to the default size. The routing unit 33 returns the MTU size to the default size. This corresponds to a step S12.

When the number of calls continues to fall below a certain threshold for more than a predetermined time period, the control unit 30 ascertains that it is warranted to increase data throughput. The control unit 30 instructs the routing unit 33 to make the fragment size larger than the default size. The routing unit 33 enlarges the MTU size, thereby making larger the packet size. This corresponds to a step S13.

As a result, data packets are divided by the default MTU size when the number of calls stays within the predetermined range. On the other hand, data packets are divided by smaller than the default MTU size when the number of calls is large, and are divided by larger than the default MTU size when the number of calls is small.

According to the fifth embodiment, the present invention changes the fragment size of data packets in response to the number of audio calls, thereby making it possible to improve data throughput while insuring desired audio quality.

[Detailed Operation]

In the following, details of operation of the VoIP router will be described with reference to the first method.

Figure 6:
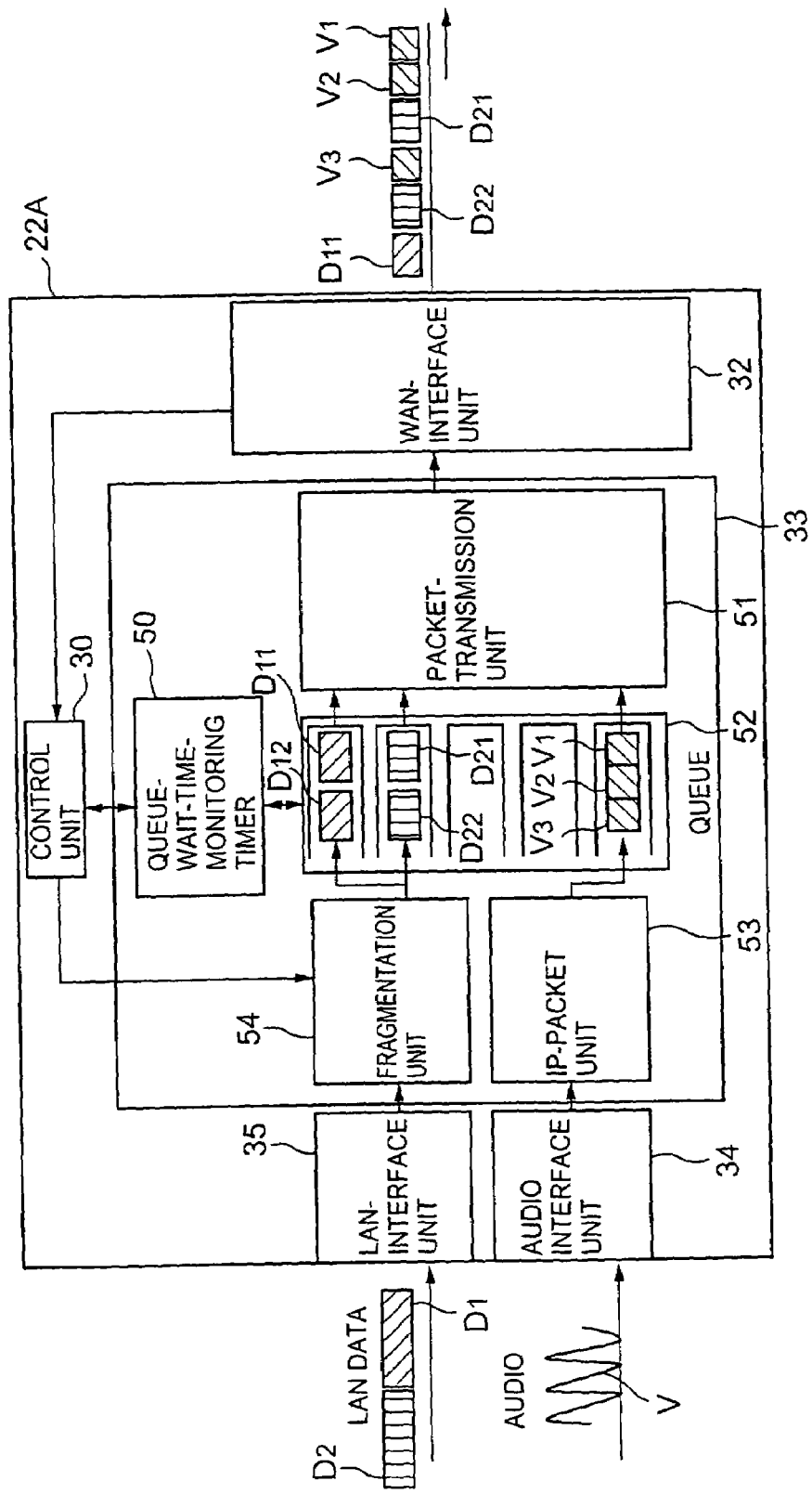
FIG. 6 is a block diagram of the VoIP router.

FIG. 6 is a block diagram of the VoIP router.

As previously described, the VoIP router includes the control unit 30, the WAN-interface unit 32, the routing unit 33, the audio-interface unit 34, and the LAN-interface unit 35.

The routing unit 33 in FIG. 6 includes a queue-wait-time-monitoring timer 50, a packet-transmission unit 51, a queue 52, an IP-packet unit 53, and a fragmentation unit 54.

The queue-wait-time-monitoring timer 50 measures a wait time of an audio packet in queue, and sends the measurement to the control unit 30. The packet-transmission unit 51 transmits audio packets ahead of other packets under the control of the control unit 30. The queue 52 has data packets and audio packets waiting therein, and is provided for each session under the control of the control unit 30. The IP-packet unit 53 converts audio signals into packets as the audio-interface unit 34 digitizes the audio signals. The fragmentation unit 54 divides data packets into fragments of a predetermined size under the control of the control unit 30.

LAN-data packets are received by the LAN-interface unit 35 of the VoIP router 22A, and are forwarded to the fragmentation unit 54 of the routing unit 33. The fragmentation unit 54 breaks the packets into fragments of proper sizes, which are then sent to the queue 52. There are a plurality of queues 52, each of which is prioritized. In FIG. 6, for example, higher priority is given to the queues as the queues come closer to the bottom. In the order of priority, the packet-transmission unit 51 takes out packets from the queues 52, and the WAN-interface unit 32 transmits these queues.

Packets each wait in the queues 52 until their turn comes. A time period during which a packet stays waiting in the queue is referred to as a wait time in queue. When audio is transmitted as packets, it is necessary to keep packet intervals constant in order to maintain audio quality. It is desirable, therefore, that a wait time in queue is as short and constant as possible. A need for a shorter wait time is satisfied by putting audio packets in the queue that is given priority. As for constancy, fluctuation of a waiting time in queue is determined by how often data having a packet length longer than audio packets are inserted between audio packets during transmission.

When the wait time in queue fluctuates violently, there is a need to shorten a fragment size of data packets. When the wait time in queue stays constant, on the other hand, it is reasonable to ascertain that audio quality is properly maintained, so that the fragment size is increased with an aim of improving data throughput.

Further, the present invention is not limited to these embodiments, but various variations and modifications may be made without departing from the scope of the present invention.

The present application is based on Japanese priority application No. 11-229468 filed on Aug. 13, 1999, with the Japanese Patent Office, the entire contents of which are hereby incorporated by reference.

What is claimed is:

1. A method of changing a fragment size of data packets in a router where a data packet is divided into data packets having the fragment size, and the data packets are transmitted to a network along with audio packets, comprising the steps of:
   acquiring, in the router, a parameter indicative of whether proper audio quality is maintained through ongoing transmission of the audio packets; and
   dynamically changing the fragment size of the data packets in response to the acquired parameter, wherein the step of dynamically changing further includes the steps of:
      comparing a current value of the parameter to an average value of the parameter;
      increasing or decreasing the fragment size in relation to a default fragment size when a deviation of the current value of the parameter from the average value of the parameter exceeds a predetermined threshold for a first predetermined period of time; and
      resuming the default fragment size when the deviation of the current value of the parameter from the average value of the parameter falls below the predetermined threshold for a second predetermined period of time.

2. The method as claimed in claim 1, wherein said step of acquiring includes a step of measuring, as said parameter, a wait time for which the audio packets wait in the router before being transmitted to the network.

3. The method as claimed in claim 1, wherein said step of acquiring includes a step of measuring, as said parameter, a delay time of the network by transmitting a hello packet to and receiving the hello packet from the network.

4. The method as claimed in claim 1, wherein said step of acquiring includes a step of counting, as said parameter, a number that indicates how many times a congestion notice is received from the network during a predetermined time period to indicate congestion of the network.

5. The method as claimed in claim 1, wherein said step of acquiring includes a step of acquiring, as said parameter, a number of audio calls from an apparatus that counts the number of audio calls.

6. The method as claimed in claim 1, wherein said step of acquiring includes a step of acquiring, as said parameter, a number of audio calls based on signaling information.

7. A router apparatus for routing and transmitting audio packets along with data packets to a network, comprising:
   a control unit which acquires a parameter indicative of whether proper audio quality is maintained through ongoing transmission of the audio packets; and
   a fragmentation unit which divides a data packet into data packets having a fragment size, and dynamically changes the fragment size in response to the acquired parameter, wherein the fragmentation unit dynamically changes the fragment size by:
      comparing a current value of the parameter to an average value of the parameter;
      increasing or decreasing the fragment size in relation to a default fragment size when a deviation of the current value of the parameter from the average value of the parameter exceeds a predetermined threshold for a first predetermined period of time; and
      resuming the default fragment size when the deviation of the current value of the parameter from the average value of the parameter falls below the predetermined threshold for a second predetermined period of time.

8. The router apparatus as claimed in claim 7, wherein said control unit measures, as said parameter, a wait time for which the audio packets wait in the router before being transmitted to the network.

9. The router apparatus as claimed in claim 7, wherein said control unit measures, as said parameter, a delay time of the network by transmitting a hello packet to and receiving the hello packet from the network.

10. The router apparatus as claimed in claim 7, wherein said control unit counts, as said parameter, a number that indicates how many times a congestion notice is received from the network during a predetermined time period to indicated congestion of the network.

11. The router apparatus as claimed in claim 7, wherein said control unit acquires, as said parameter, a number of audio calls from an apparatus that counts the number of audio calls.

12. The router apparatus as claimed in claim 7, wherein said control unit acquires, as said parameter, a number of audio calls based on signaling information.

* * * * *